March 5, 1940.  F. HARVEY  2,192,587
BUS BAR DISTRIBUTION SYSTEM
Filed Oct. 3, 1936  2 Sheets—Sheet 1
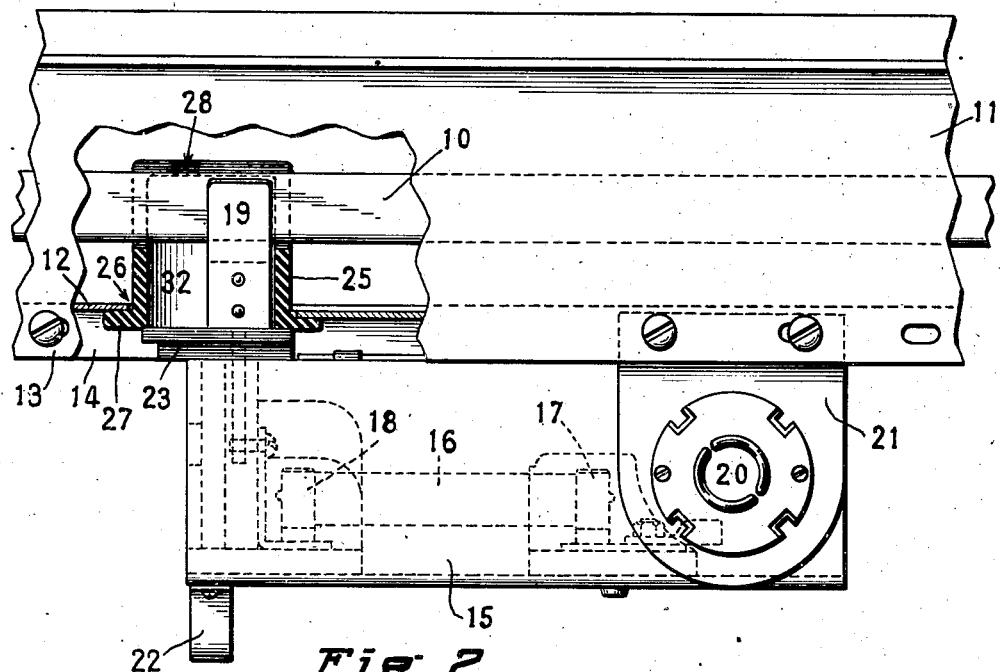
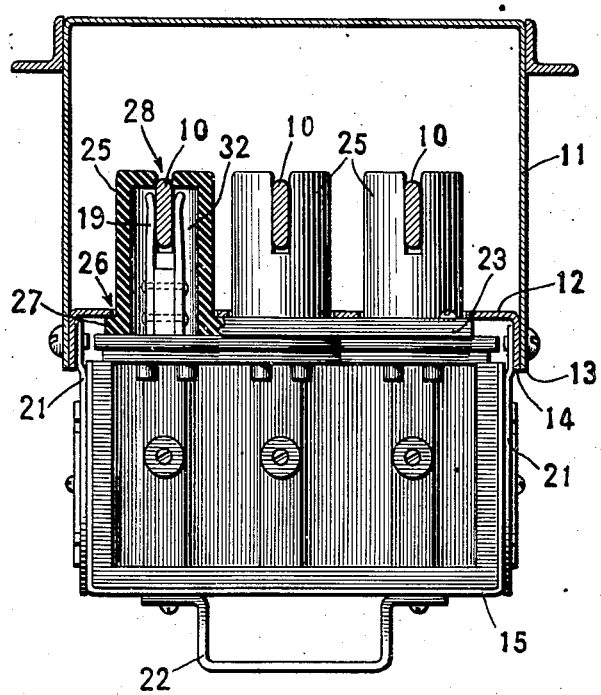
INVENTOR
FRANK HARVEY,
BY
ATTORNEY March 5, 1940.                F. HARVEY                    2,192,587
                      BUS BAR DISTRIBUTION SYSTEM
                        Filed Oct. 3, 1936         2 Sheets-Sheet 2
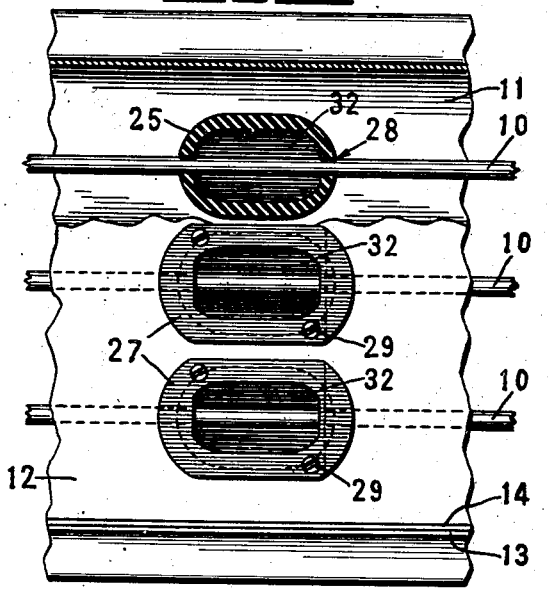
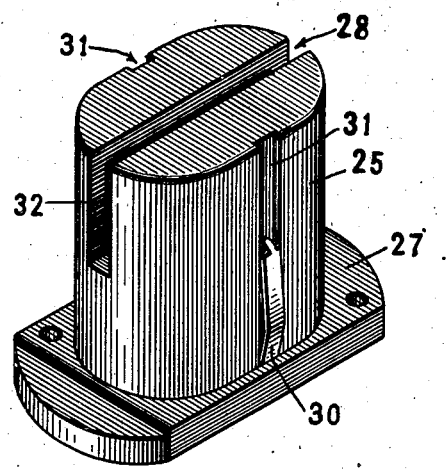
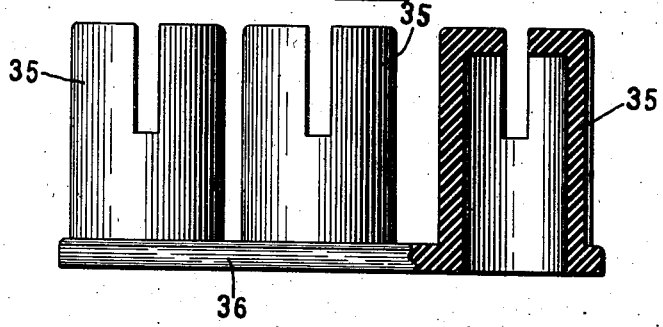
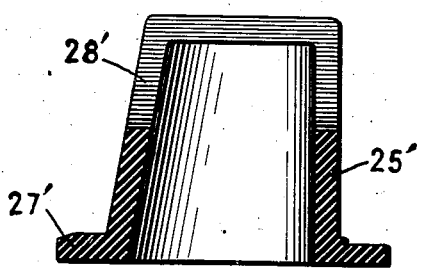
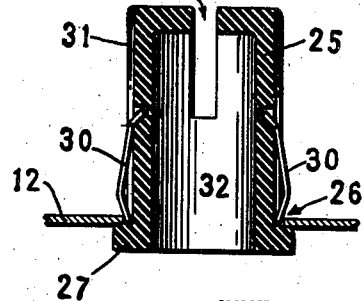
INVENTOR
FRANK HARVEY,
BY
ATTORNEY Patented Mar. 5, 1940

2,192,587

UNITED STATES PATENT OFFICE 2,192,587

BUS BAR DISTRIBUTION SYSTEM

Frank Harvey, Cincinnati, Ohio, assignor to The Trumbull Electric Manufacturing Company, Plainville, Conn., a corporation of Connecticut Application October 3, 1936, Serial No. 103,816

10 Claims. (Cl. 173—334.1)

My invention relates particularly to the means for prevention of arcing between the bus bars and the plug-in device.

Branch connections to the bus bars are effected by devices adapted to be connected detachably to the bus bars. When the circuit is broken by pulling out the plug-in device while a load is on the branch circuit, arcing frequently occurs which is likely to injure the bus bars as well as the plug-in device. In fact, arcing is dangerous to the operator as well as likely to damage the bus bar conduit. To prevent or minimize arcing I have sometimes used guard sleeves attached to the connector or plug-in device and surrounding the contact jaws. In many cases, however, even this is ineffective and dangerous arcing may occur inside of the conduit. The main object of my present invention is to still further reduce arcing under such circumstances. In fact I have designed this device so that it is possible to use the plug-in device as a switch for opening and closing the branch circuit.

This is accomplished by providing the bus bar conduit with openings in its under face and mounting in such openings insulating cup-like devices which remain in the conduit and serve to provide pockets within which the contact jaws engage the bus bars and which sleeves serve to confine the arc when the contact jaws are withdrawn.

These may be used with plug-in devices which have the usual contact jaws or may be used with jaws which themselves are guarded as shown in my applications Serial Number 682,999, filed July 31, 1933, now Patent Number 2,038,107; Number 20,947 filed May 11, 1935; and Number 103,815 filed October 3, 1936, now Patent Number 2,161,571. These stationary guard pockets may be formed in various ways as shown herein.

Fig. 1 is a side view of a fragment of a bus bar conduit with a branch connector in place, part of the conduit being broken away and showing a guard pocket in section.

Fig. 2 is a cross sectional view of the same parts.

Fig. 3 is a fragmentary view partly in section of the conduit and guard pockets.

Fig. 4 is a perspective view of one form of pocket.

Fig. 5 is a sectional view of the same device.

Fig. 6 is a sectional view of a modification.

Fig. 7 is a side view and partial section showing three pockets united.

In the form shown the bus bars 10 are suitably mounted in a conduit consisting of a main channel member 11 and a cover 12 having overlapping flanges 13 and 14 respectively suitably secured together.

The connector box 15 contains the protecting fuses 16 mounted in clips 17 and 18 which are connected respectively to the branch cable (not shown) and the contact jaws 19. The branch cable may enter the box in any suitable manner for instance through a knock-out opening 20 coaxial with the hinge lug 21 which is secured to the conduit. The box has a handle 22 or other suitable means for actuating the plug-in connector. The jaws 19 are mounted in an insulating block 23 and are preferably resilient so as to better grip the bus bar. The bus bars preferably have decidedly rounded edges as shown in the drawing which materially aids in reducing arcing when breaking the circuit.

Adjacent each bus bar is mounted an insulating cup-like member 25 in a position to receive a contact jaw. This pocket is set in an opening 26 in the cover of the conduit and has a flange 27 which covers the edge of the opening. The inner end of the cup-like member is slotted at 28 to fit the bus bar. This member 25 is detachably fastened in a suitable manner for instance by screws 29 to the cover 12 (see Fig. 3), or by springs 30 (see Figs. 4 and 5) which may be mounted in grooves 31.

The pocket 32 in the member 25 is made large enough to accommodate the movement of the contact jaws. The form 25' shown in Fig. 6 is inclined somewhat to facilitate an angular action of the plug contacts.

Preferably the members 25 are made separately as this is cheaper and facilitates installation and replacement. They may, however, be molded or cast in one piece as shown in Fig. 7 where a number of pocket members 35, 35, 35 are integral with a plate or flange member 36 and spaced apart to correspond with the spacing of the bus bars.

Although I have shown the arc suppressors with a hinged type of connector it should be understood that a straight plug-in type such as shown in my Patent 2,038,107 might be employed. In any event the shield or arc chute tends to confine the arc and prevent it from drawing out to a dangerous degree.

The special advantage of this invention is that the arc suppressors can be assembled or applied to the duct and bus bars while the bus bars are in place and that they can be removed without disturbing the bus bars. Such a construction makes it possible to form the arc suppressor of a single piece so that it is cheap to make and easy to apply to an installed bus bar duct system.

I claim:

1. An arc suppressor for a bus bar conduit formed of a single piece of insulating material of cup-like form and having a pocket to receive a contact jaw and a slot to receive a bus bar and a flange to surround the outer edges of an opening in the cover plate of the conduit.

2. In a bus bar conduit, a housing therefor, a cover for the housing having an opening, a cup-shaped arc suppressor of insulating material detachably positioned in said opening from the outside of said housing and formed with a pocket to receive a contact jaw and an open slot to receive a bus bar, the edges of the material at the slot embracing the bus bar.

3. In a bus bar conduit, a housing therefor, a cover for the housing having an opening, a cup-shaped arc suppressor of insulating material positioned in said opening and formed with a pocket to receive a contact jaw and a slot to receive a bus bar and a flange to surround the outer edges of said opening and means to fasten said arc suppressor to the conduit housing.

4. In a bus bar conduit system, a housing for a number of spaced bus bars having a number of openings aligned with the bus bars, a detachable insulating pocket in each opening for embracing the bus bars and providing a pocket into which the contact jaws of a plug-in device are inserted to complete a branch circuit and spring means for detachably fastening each pocket to the conduit housing.

5. A bus duct and plug type electrical distribution system comprising a duct containing a bus bar and having a hole providing access to the bus bar through which may be inserted a bus bar engaging plug prong, and means for shielding the prong, comprising a prong shield carried by the duct and disposed at said hole, and having on its interior end a slot for receiving a bus bar therein, the shield being hollow to provide a prong way or well therein which opens at its interior end into the slot and at its other end to the ambient atmosphere at a point outside the duct, the prong shield having on its last mentioned end a formation for engaging the duct and thus preventing the shield from being completely inserted into the duct through the duct hole.

6. An arc suppressor for bus bar conduits comprising a cup-like member of insulating material having means for detachably securing it in an opening in a wall of a conduit, said member having an open slot in its inner end extending along the sides of the member and permitting said member to be applied to a bus bar while the bus bar is in place in a conduit, said member having a pocket open at its outer end to receive a branch connector terminal prong, said slot opening into said pocket so that a terminal prong inserted into the outer end of said pocket may engage a bus bar extending through said slot.

7. A bus duct and plug type electrical distribution system comprising a duct containing a bus bar and having a hole providing access to the bus bar through which may be inserted a bus bar engaging plug prong, and means for shielding the prong, comprising a prong shield carried by the duct and disposed at said hole and having on its interior end a slot open at the end of the shield for receiving a bus bar therein, the shield being hollow to provide a prong way or well therein which opens at its interior end into the slot and at its other end to the ambient atmosphere at a point outside the duct.

8. A bus duct and plug type electrical distribution system comprising a duct containing a bus bar and having a hole providing access to the bus bar through which may be inserted a bus bar engaging plug prong, and means for shielding the prong, comprising a prong shield carried by the duct and disposed at said hole, and having on its interior end a slot for receiving a bus bar therein, the shield being hollow to provide a prong way or well therein which opens at its interior end into the slot and at its other end to the ambient atmosphere at a point outside the duct, the slot permitting the shield to be assembled in a bus-containing duct and on the bus bar therein by being inserted into the duct through the duct hole while the bus bar is in place in the duct and permitting the shield to be removed without disturbing the bus bar.

9. A bus duct and plug type electrical distribution system comprising a duct containing a bus bar and having a hole providing access to the bus bar through which may be inserted a bus bar engaging plug prong, and means for shielding the prong, comprising a prong shield carried by the duct and disposed at said hole, and having on its interior end a slot for receiving a bus bar therein, the shield being hollow to provide a prong way or well therein which opens at its interior end into the slot and at its other end to the ambient atmosphere at a point outside the duct, the prong shield having on its last mentioned end a formation for engaging the duct and thus preventing the shield from being completely inserted into the duct through the duct hole, the slot permitting the shield to be assembled in a bus-containing duct and on the bus bar therein by being inserted into the duct through the duct hole.

10. In a bus bar conduit system, a sheet metal conduit containing a longitudinally extending naked bus bar and having an opening providing an access hole for a contact prong to engage said bus bar or be disengaged therefrom, and a hollow arc suppressor at said hole for surrounding a prong therein when it is in engagement with said bus bar and for confining any arc formed on disengagement of the prong from the bus bar to the interior of the suppressor, the latter being formed of insulating material and having openings therethrough, through at least one of which passes the bus bar when the suppressor is in place thereon, and another of which opens to the front of the suppressor and through which passes the prong, the last mentioned hole then aligning with the conduit hole, the suppressor being of unitary form and having its bus bar receiving opening formed in the nature of a slot opening in the opposite sides of the suppressor and so formed and shaped that the suppressor can be assembled or disassembled with respect to the bus bar without itself being disassembled from its unitary form, the suppressor being formed to substantially fill and seal the conduit hole whereby the interior of the conduit communicates with the ambient atmosphere through the prong receiving suppressor opening, the bus bar receiving opening in the suppressor also opening to the inner end of the suppressor whereby it may be moved through said hole and transversely of the bus bar, in the direction of prong insertion, towards and onto the bus bar, the conduit and suppressor being so formed relatively that formations on them coact relatively to limit movement of the suppressor transversely of the bus bar.

FRANK HARVEY.